United States Patent [19]

Liao

[11] Patent Number: 5,674,022
[45] Date of Patent: Oct. 7, 1997

[54] TOOL WITH HANDLE

[75] Inventor: Dick Liao, Bridgewater, Mass.

[73] Assignee: Greenlife, Inc., Bridgewater, Mass.

[21] Appl. No.: 474,699

[22] Filed: Jun. 7, 1995

[51] Int. Cl.$^6$ .................................................. A01B 1/06
[52] U.S. Cl. ........................ 403/24; 172/371; 56/400.04; 403/376
[58] Field of Search .................................. 403/379, 378, 403/377, 376, 24, 380; 172/371–381, 21; 56/400.01, 400.04, 400.05, 400.06; 294/57, 58, 59

[56]  References Cited

U.S. PATENT DOCUMENTS

| 935,473 | 9/1909 | Doidge | 56/400.01 |
|---|---|---|---|
| 1,034,992 | 8/1912 | Fulcher | 172/371 |
| 1,043,459 | 11/1912 | Perry | 172/378 |
| 1,442,959 | 1/1923 | McComish | 403/376 X |
| 1,665,183 | 4/1928 | Urban | 172/375 |
| 1,741,587 | 12/1929 | Schau | 403/379 X |
| 1,845,222 | 2/1932 | Birn | 172/371 |
| 2,083,918 | 6/1937 | Napolis et al. | 172/375 |
| 2,852,996 | 9/1958 | Meyer | 172/378 |
| 3,176,780 | 4/1965 | Sommer | 172/377 |
| 3,234,720 | 2/1966 | Blodgett | 56/400.05 |
| 4,593,520 | 6/1986 | Krizman | 56/400.06 |
| 4,790,585 | 12/1988 | Vernon et al. | 56/400.04 X |

OTHER PUBLICATIONS

Greenlife, Inc. Catalog, "The Old Gardener™", *Quality Lawn & Garden Tools*, pp. 1–6, 20.
UnionTools® Product Catalog, 1992, pp. 9–20, 45–50.
Ames Full Line Catalog, No. 9500, Jun., 1992, pp. 1–8, 29–34, 37–40.
True Temper® 1995–1996 Catalog, Oct., 1994.
Corona Catalog, 1993, pp. 7, 5.
Fiskars® Catalog, 1995, pp. 11, 7.
Gilmour Group Catalog, 1994, pp. 10, 8.
Shear Magic Catalog.

*Primary Examiner*—Harry C. Kim
*Attorney, Agent, or Firm*—Fish & Richardson P.C.

[57]  ABSTRACT

The invention features a tool having a structure which rigidly secures the implement portion of a manual tool to its handle. The tool includes a handle having a first bore extending along a longitudinal axis and distal end of the handle, a washer having an aperture concentric with the first bore and disposed at the distal end of the, a ferrule disposed over the distal end of the handle and the washer, an implement including a shaft portion disposed through the aperture of the washer and within the first bore of said handle, and a fastening element cooperating between the ferrule and shaft portion to secure the implement to the wooden handle.

20 Claims, 1 Drawing Sheet

TOOL WITH HANDLE

BACKGROUND OF THE INVENTION

The invention relates to a tool designed to be grasped by the hand.

Tools generally are used to ease the workload of an operator in performing a particular operation, such as cutting, shaping or moving of material.

A manual tool generally includes at least one handle to allow the user to confidently grasp the tool and position the working implement portion of the tool at the work site. Moreover, the handle transfers the work energy provided by the operator to the implement of the tool. The size and length of the handle may be selected in certain applications to allow the user to achieve leverage in performing the work.

The attachment of the implement to the handle is critical to the operation and life of the tool because in many applications the attachment point is subjected to severe stress and strain.

SUMMARY OF THE INVENTION

The invention features, in general, a tool having a structure which rigidly secures the implement portion of a manual tool to its handle. The structure can be fabricated using relatively inexpensive piece parts without sacrificing strength and reliability of the tool, thereby assuring safer use and longer life.

In one aspect of the invention, the tool includes a handle having a first bore extending along a longitudinal axis and distal end of the handle, a washer having an aperture concentric with the first bore and disposed at the distal end of the handle, a ferrule disposed over the distal end of the handle and the washer, an implement including a shaft portion disposed through the aperture of the washer and within the first bore of the handle, and a fastening element cooperating between the ferrule and shaft portion to secure the implement to the wooden handle.

In preferred embodiments, the fastening element includes a pin passing through the ferrule and extending into the first bore of the handle. The ferrule includes proximal and distal end portions with the distal end portion having an inner diameter smaller than an inner diameter of the proximal portion. The distal end portion of the ferrule may be domed-shaped and has an inner surface contacting the washer along a surface transverse to the longitudinal axis. The aperture and the first bore may be coextensive. The handle includes a second bore, transverse to the longitudinal axis of the handle, passing through the distal end of the handle. The ferrule includes a first hole concentric with the second bore of the handle, with the pin disposed through the second bore and the first hole, which are generally coextensive with each other. The shaft portion includes a second hole concentric with the second bore of the handle with the pin disposed through the second bore and the first and second holes. The ferrule, shaft portion of the implement and the pin are preferably fabricated from metal with the handle fabricated from wood.

The implement may be any of a wide variety of tools including gardening tools, such as shovels, hoes, rakes, pruners, loppers, and the like.

Other advantages and features of the invention will be apparent from the following description of the preferred embodiment and from the claims.

DESCRIPTION OF THE PREFERRED EMBODIMENTS

Figure 1:
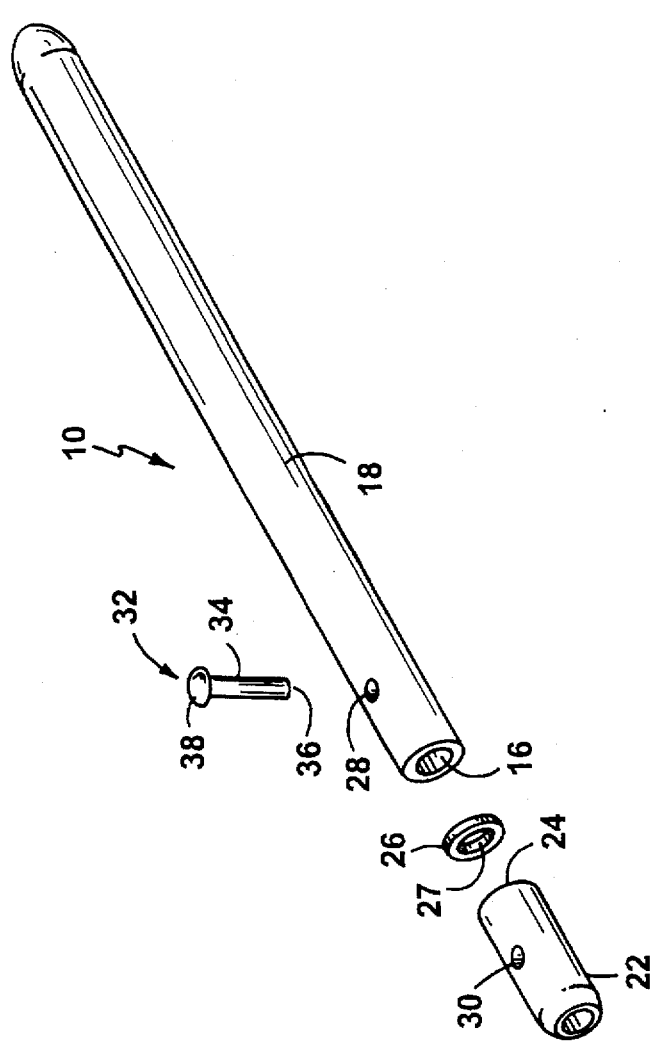
FIG. 1 is an exploded perspective view of a tool having a rigidly secured handle according to the invention.
Figure 2:
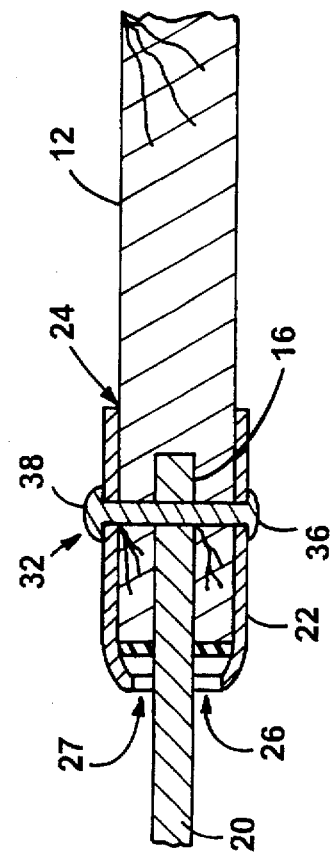
FIG. 2 is a sectional view of a portion of the tool of FIG. 1.

Referring to FIGS. 1 and 2, a garden tool 10, here a garden hoe, is shown with a wooden handle 12 rigidly secured to a garden tool implement 14, such as shown here, a metal hoe blade. The handle 12 includes a bore 16 extending a sufficient length within the distal end 18 of the handle for receiving a shaft 20 of the implement 14. The tool 10 further includes a metal ferrule 22 having, at a proximal end an aperture 24 having, an inner diameter approximately that of the outer diameter of the handle 12 to provide a snug fit therebetween. The distal end of the ferrule 22 is formed to be tapered or domed-shaped with an aperture having a diameter approximately that of the shaft 20 of implement 14. The domed-shaped distal end of ferrule 22 also captures and supports a metal washer 26 having an outer diameter approximately that of the outer diameter of handle 12 and a aperture 27 sized to allow shaft 20 to pass therethrough. Handle 12, ferrule 22, and shaft 20 each include an aperture 28, 30, and 31, respectively, for receiving a metal fastening pin 32 which when disposed through the apertures rigidly secures the implement 14 and ferrule 22 to the handle 12.

To assemble garden tool 10, washer 26 is positioned within ferrule 22 so that aperture 27 of the washer is aligned concentrically with aperture 24 of the ferrule. The distal end of the wooden handle 12 is then snugly fitted within ferrule 22 until the distal end of the handle abuts washer 26. Handle 12, ferrule 22 and shaft 20 may require rotation with respect to each other in order to align apertures 28, 30, and 31 so that metal fastening pin 32 can be inserted through the apertures. Pin 32 has a neck portion 34 with a sufficient length to allow an end portion 36 of the pin to extend through tool 10 when the head portion 38 of the pin contacts the ferrule 22. As shown particularly in FIG. 2, the exposed end portion 36 is generally flattened using a press or other tool to firmly secure the pin to the tool and to prevent the pin from withdrawing from apertures 28, 30, and 31.

When the gardening tool is in use, forces applied to the implement 14 are transferred through the shaft 20 and to the handle 12 via their attachment at the ferrule 22. Washer 26 serves to absorb some of the stress while pin 32 assures that the individual parts are rigidly maintained together as an assembly.

Other Embodiments

Other embodiments of the invention are within the scope of the claims. For example, the attachment structure described above may be used with a wide variety of tools including shears, loppers, and long-handled tools (e.g., bow rakes, shovels, tree top pruners).

What is claimed is:

1. A tool comprising:
   a handle having a longitudinal axis including a first bore at a distal end extending along the longitudinal axis,
   a washer disposed at the distal end of said handle and having an aperture concentric with the first bore of said handle;
   a ferrule disposed over the distal end of said handle and said washer;
   an implement including a shaft disposed through the aperture of said washer and within the first bore of said handle, the shaft spaced from an inner surface of the ferrule, the washer sized to contact the inner surface of the ferrule and the aperture of the washer sized to contact the shaft extending therethrough; and a pin passing through said ferrule and extending into the first bore of said handle, thereby securing said implement to said handle.

2. The tool of claim 1 wherein said ferrule comprises proximal and distal end portions, the distal end portion having an inner diameter smaller than an inner diameter of the proximal portion, the washer sized to contact the inner surface of the ferrule at the distal end portion of the ferrule and along a surface of the washer transverse to the longitudinal axis.

3. The tool of claim 2 wherein the distal end portion of said ferrule is domed-shaped.

4. The tool of claim 1 wherein the aperture and the first bore are coextensive.

5. The tool of claim 1 wherein said handle comprises a second bore at the distal end passing through the handle, the second bore being transverse to the longitudinal axis of said handle, said ferrule comprises a first hole concentric with the second bore of said handle, and said pin disposed through the second bore and the first hole.

6. The tool of claim 5 wherein the second bore and the first hole are coextensive.

7. The tool of claim 5 wherein the shaft portion comprises a second hole concentric with the second bore of said handle, said pin being disposed through the second bore and the first and second holes.

8. The tool of claim 5 wherein said pin is metal.

9. The tool of claim 1 wherein said ferrule and the shaft portion of the implement are metal.

10. The tool of claim 1 wherein said handle is fabricated from wood.

11. The tool of claim 4 wherein said implement comprises a blade.

12. A method of providing a tool comprising the steps of:

providing a handle having a longitudinal axis and a first bore at a distal end extending along the longitudinal axis, positioning a washer at the distal end of said handle, said washer having an aperture concentric with the first bore of said handle;

positioning a ferrule over the distal end of said handle and said washer, assembling a shaft of an implement through the distal end portion of said ferrule and the aperture, and within the first bore of said handle such that the shaft is spaced from an inner surface of the ferrule, said washer sized to contact the inner surface of the ferrule and the aperture of the washer sized to contact the shaft extending therethrough; and fitting a fastening element between said ferrule and shaft portion to secure said implement to said handle.

13. The method of claim 12 further comprising the step of forming within said handle a second bore at the distal end passing through the handle, the second bore being transverse to the longitudinal axis of said handle, and making within said ferrule a first hole concentric with the second bore of said handle, and said fitting a fastening element step further comprising positioning a pin through the second bore and the first hole.

14. The method of claim 13 further comprising the step of flattening a distal end of said pin to secure said pin to said handle.

15. The method of claim 13 further comprising the step of making a second hole, within the shaft portion of said implement, concentric with the second bore of said handle, and providing said pin through the second bore and the first and second holes.

16. A tool comprising:

a wooden handle having a longitudinal axis including a first bore at a distal end extending along the longitudinal axis, a washer disposed at the distal end of said wooden handle and having an aperture concentric with the first bore of said wooden handle;

a ferrule disposed over the distal end of said wooden handle and said washer, an implement including a shaft portion disposed through the aperture of said washer and within the first bore of said wooden handle, the shaft spaced from an inner surface of the ferrule, the washer sized to contact the inner surface of the ferrule and the aperture of the washer sized to contact the shaft extending therethrough; and a fastening element cooperating between said ferrule and shaft portion to secure said implement to said wooden handle.

17. The tool of claim 16 wherein said ferrule comprises proximal and distal end portions, the distal end portion having an inner diameter smaller than an inner diameter of the proximal portion, the washer sized to contact the inner surface of the ferrule at the distal end portion of the ferrule and along a surface of the washer transverse to the longitudinal axis.

18. The tool of claim 17 wherein the distal end portion of said ferrule is domed-shaped.

19. The tool of claim 16 wherein the aperture and the first bore are coextensive.

20. The tool of claim 16 wherein said wooden handle comprises a second bore at the distal end passing through the wooden handle, the second bore being transverse to the longitudinal axis of said wooden handle, said ferrule comprises a first hole concentric with the second bore of said wooden handle, and said pin disposed through the second bore and the first hole.

* * * * *